US010665052B2

(12) United States Patent
Chapman

(10) Patent No.: US 10,665,052 B2
(45) Date of Patent: May 26, 2020

(54) GAMING MACHINE, METHOD, AND PROGRAM PRODUCT WITH SIMULATED WHEEL SPIN

(71) Applicant: Everi Games, Inc., Austin, TX (US)

(72) Inventor: Matthew F. Chapman, Austin, TX (US)

(73) Assignee: Everi Games, Inc., Austin, TX (US)

(*) Notice: Subject to any disclaimer, the term of this patent is extended or adjusted under 35 U.S.C. 154(b) by 97 days.

(21) Appl. No.: 16/059,937

(22) Filed: Aug. 9, 2018

(65) Prior Publication Data

US 2020/0051372 A1 Feb. 13, 2020

(51) Int. Cl.

| | |
|---|---|
| ***A63F 13/00*** | (2014.01) |
| ***G07F 17/32*** | (2006.01) |
| ***A63F 5/04*** | (2006.01) |
| *G07F 17/34* | (2006.01) |

(52) U.S. Cl.

CPC .......... *G07F 17/3213* (2013.01); *A63F 5/045* (2013.01); *G07F 17/3234* (2013.01); *G07F 17/3258* (2013.01); *G07F 17/3267* (2013.01); *G07F 17/34* (2013.01)

(58) Field of Classification Search

CPC ............. G07F 17/3209; G07F 17/3211; G07F 17/3267; G07F 17/34; G07F 17/3213; G07F 17/3234; G07F 17/3258; A63F 5/045

USPC ................................................ 463/16–20, 31

See application file for complete search history.

(56) References Cited

U.S. PATENT DOCUMENTS

| | | | | |
|---|---|---|---|---|
| 10,332,348 B2 * | 6/2019 | Halter | G07F 17/3258 | |
| 2011/0165932 A1 * | 7/2011 | Rommerdahl | G07F 17/3209 | 463/17 |
| 2014/0113698 A1 * | 4/2014 | Rakestraw | G07F 17/3239 | 463/20 |
| 2015/0209656 A1 * | 7/2015 | Jones | A63F 5/0011 | 273/149 R |
| 2016/0093133 A1 * | 3/2016 | Kelly | G07F 17/322 | 463/13 |
| 2017/0236382 A1 * | 8/2017 | Colvin | G07F 17/3213 | 463/17 |
| 2019/0108727 A1 * | 4/2019 | Berlec | G07F 17/3272 | |

* cited by examiner

*Primary Examiner* — Michael A Cuff

(74) *Attorney, Agent, or Firm* — The Culbertson Group, P.C.; Nathan H. Calvert

(57) ABSTRACT

A slot machine, gaming method, and program product are provided to simulate a wheel spin interaction. A simulated wheel object is provided with physical simulation of movement interactions both with a player and with a simulated flapper object through simulated pin objects present on the wheel. Player interaction is simulated to allow wheel pull back and spin activation. Flapper interaction is simulated to provide realistic interaction of the wheel and flapper with displacement by the simulated pins in both directions. The wheel may also be decelerated and nudged by the simulated pins.

19 Claims, 9 Drawing Sheets

GAMING MACHINE, METHOD, AND PROGRAM PRODUCT WITH SIMULATED WHEEL SPIN

TECHNICAL FIELD OF THE INVENTION

The invention relates to multimedia displays for wagering games and touch interaction technology for such games.

BACKGROUND OF THE INVENTION

Various slot machine games are known that provide wagering games in a variety of ways. Some existing games include a wheel spin game round, typically part of a bonus round or a progressive prize bonus round, in which a player activates a spin of a wheel which selects a segment corresponding to a prize.

Typically such wheel spin rounds are presented as animations without a significant player interaction with the wheel. Such animations typically do not include a developed simulation of the physical, mechanical aspects of a wheel spinning and stopping. They also typically lack a further simulation of the mechanical pins that might be present along the outer edge of the wheel in a similar mechanical wheel spin game. Further, existing systems lack any realistic interaction between the wheel and a flapper object interacting with the wheel during a spin.

What is needed are better ways to simulate player interaction with a wheel spin game, and to simulate the mechanics of a wheel spin in order to increase player excitement and enjoyment of slot machine games.

SUMMARY OF THE INVENTION

A gaming machine, gaming method, and program product are provided to simulate a wheel spin interaction. A simulated wheel object is provided with physical simulation of movement interactions both with a player and with a simulated flapper object through simulated pin objects present on the wheel. Player interaction is simulated to allow wheel pull back and spin activation. Flapper interaction is simulated to provide realistic interaction of the wheel and flapper with displacement by the simulated pins in both directions. The wheel may also be decelerated and nudged by the simulated pins.

According to a first embodiment, a gaming machine is provided for conducting a wagering game. The machine includes a display, an audio device, a wager input device, and at least one electronic controller operatively coupled to the wager input device, the audio device, one or more electronic displays associated with the gaming cabinet, at least one of the displays having a touchscreen interface. The at least one electronic controller is configured to execute instructions related to the wagering game and to cause cash value credits to be awarded to a player in response to wagering wins. The machine is run by software programming stored in a tangible, non-transitory electronically accessible memory coupled to the at least one electronic controller. The software includes program code executable by the at least one electronic controller to execute a wheel spin game round including responding to player input and simulating a physical wheel with associated interactions. The simulation includes displaying a simulated wheel object (wheel) on one of the electronic displays, the wheel including multiple segments separated radially, and simulated pin objects separating the segments along the edge of the wheel and having a defined size. The simulation displays a simulated flapper object along an edge of the wheel, the simulated flapper object having a first end outside of the wheel radius and a second extending, in a rest position, radially inside the wheel radius at least to the radial location of the simulated pin objects, and an axis of rotation disposed toward the first end. The simulation includes receiving a player touch input through the touchscreen interface to move the wheel and activate a wheel spin and allowing the player touch input, while engaged, to move the wheel in a default wheel spin direction or to pull back the wheel opposite to the default wheel spinning direction. The simulation also includes simulating physical interaction of the simulated flapper object and the simulated pin objects by, (a) if the wheel is moving in the default wheel spin direction, rotationally displacing the simulated flapper object in the default wheel spin direction to allow the simulated pin object to pass and (b) if the wheel is moving opposite to the default wheel spin direction, rotationally displacing the simulated flapper object opposite to the default wheel spin direction to allow the pin to pass.

According to some embodiments, the program code is further executable for, when the wheel spin is activated, simulating a wheel spin in the default wheel spin direction and then simulating a spin deceleration and a wheel stop. While simulating the wheel spin, it further simulates physical interaction of the simulated flapper object and the simulated pin objects including an additional wheel deceleration when the simulated flapper object is displaced by a passing simulated pin object. If a simulated velocity of the wheel when beginning the simulated physical interaction is less than the additional wheel deceleration, simulating a nudge of the wheel opposite the default wheel spin direction. Simulating the nudge of the wheel may include calculating a wheel movement based on a flapper rotation variable, a nudge velocity variable, and a nudge deceleration variable.

Another embodiment is a method for providing player interaction on a gaming machine. The method includes, under control of an electronic processor in a gaming machine, displaying a simulated wheel object (wheel) on an electronic display, the wheel including multiple segments separated radially, and simulated pin objects separating the segments along the edge of the wheel and having a defined size. The method displays a simulated flapper object along an edge of the wheel, the simulated flapper object having a first end outside of the wheel radius and a second extending, in a rest position, radially inside the wheel radius at least to the radial location of the simulated pin objects, and an axis of rotation disposed toward the first end. The method receives a player touch input through a touchscreen interface of the electronic display to move the wheel and activate a wheel spin, and allows the player touch input, while engaged, to move the wheel in a default wheel spin direction or to pull back the wheel opposite to the default wheel spinning direction. The method also includes simulating physical interaction of the simulated flapper object and the simulated pin objects by, (a) if the wheel is moving in the default wheel spin direction, rotationally displacing the simulated flapper object in the default wheel spin direction to allow the simulated pin object to pass and (b) if the wheel is moving opposite to the default wheel spin direction, rotationally displacing the simulated flapper object opposite to the default wheel spin direction to allow the pin to pass.

Some embodiments of the method include, when the wheel spin is activated, simulating a wheel spin in the default wheel spin direction and then simulating a spin deceleration and a wheel stop, and while simulating the wheel spin, further simulating physical interaction of the simulated flapper object and the simulated pin objects including an additional wheel deceleration when the simulated flapper object is displaced by a passing simulated pin object. If a simulated velocity of the wheel when beginning the simulated physical interaction is less than the additional wheel deceleration, the method simulates a nudge of the wheel opposite the default wheel spin direction. In some embodiments, the nudge of the wheel includes calculating a wheel movement based on a flapper rotation variable, a nudge velocity variable, and a nudge deceleration variable. In some embodiments, the method includes tracking states of the wheel including a pulling back state in which the player is pulling back the wheel, a spinning up state in which the wheel is accelerating to begin a wheel spin, a spinning state, and a stopping state in which the nudge may be applied. In some embodiments the method includes activating the wheel spin upon disengagement of the player touch input by removing the touch input or moving the touch input out of a designated area, and in response to the player pulling back the wheel before the touch disengagement to determine an initial velocity of the wheel spin based on a rotational distance that the wheel is pulled back. The electronic display may be a group display associated with the gaming machine and one or more additional gaming machines in a group, and in the gaming machine is operable to conduct the wheel spin and player touch interaction. Rotationally displacing the simulated flapper object opposite to the default wheel spin direction to allow the pin to pass may further include tracking a rotational angle of the flapper object, tracking a moving position of the simulated pin object, and calculating a rotational displacement based on the thickness of the simulated pin object. Rotationally displacing the simulated flapper object opposite to the default wheel spin direction to allow the pin to pass may further include producing a simulated return to a stationary position of the simulated flapper object following the displacement.

Another embodiment is program code stored on a tangible, non-transitory computer readable medium. The program code contains instructions executable by at least one electronic controller for executing the steps of the method in the various versions described herein.

Another embodiment of the invention is a gaming system that includes one or more gaming servers, and a group of electronic gaming machines connected to the servers by a network, programmed as set forth above. The various functionality described herein may be distributed between the electronic gaming machines and the gaming servers in any practically functional way. For example, the current preferred architecture is for the servers to determine all aspects of game logic, random number generation, and prize awards. The gaming machines provide functionality of interfacing with the player and animating the game results received from the server in an entertaining manner. However, other embodiments might use a thin client architecture in which the simulation is also conducted by the server, and electronic gaming machines serve merely as a terminal to receive button or touch screen input from the player and to display graphics received from the server.

These and other advantages and features of the invention will be apparent from the following description of the preferred embodiments, considered along with the accompanying drawings.

DETAILED DESCRIPTION OF PREFERRED EMBODIMENTS

Figure 1:
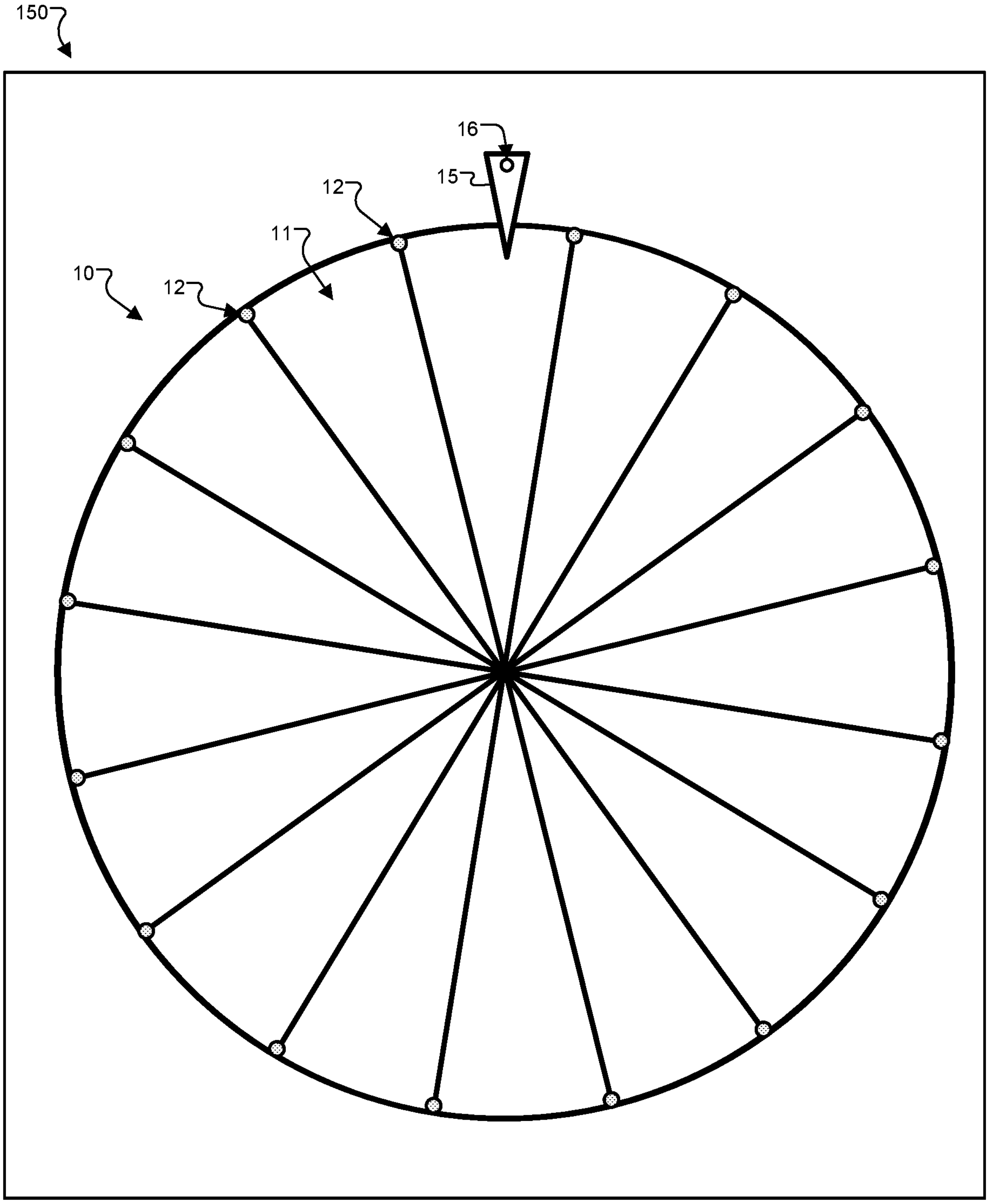
FIG. 1 is a screen display diagram showing the primary display and secondary (top) display to illustrate an example slot machine display arrangement.

FIG. 1 shows a diagram of a wheel spin touchscreen interface 150 according to an example embodiment. The interface may appear on a gaming machine main display, a secondary display, or a group display associated with a group of gaming machines. Depicted is a simulated wheel object (wheel) 10, visually divided into multiple segments 11. The segments 11 are separated along the outer radius of the wheel 10 by simulated pin objects 12, which simulate pins rising from a physical wheel, for example like those on popular television shows where wheels are spun to win prizes. Toward the top is a simulated flapper object 15, which extends from outside the area of wheel 10 to radially inside the outer edge of the wheel 10 at least two the radio location of simulated pin objects 12, and preferably a little further. Simulated flapper object 15 is simulated to rotationally displace about an axis of rotation 16.

Figure 2:
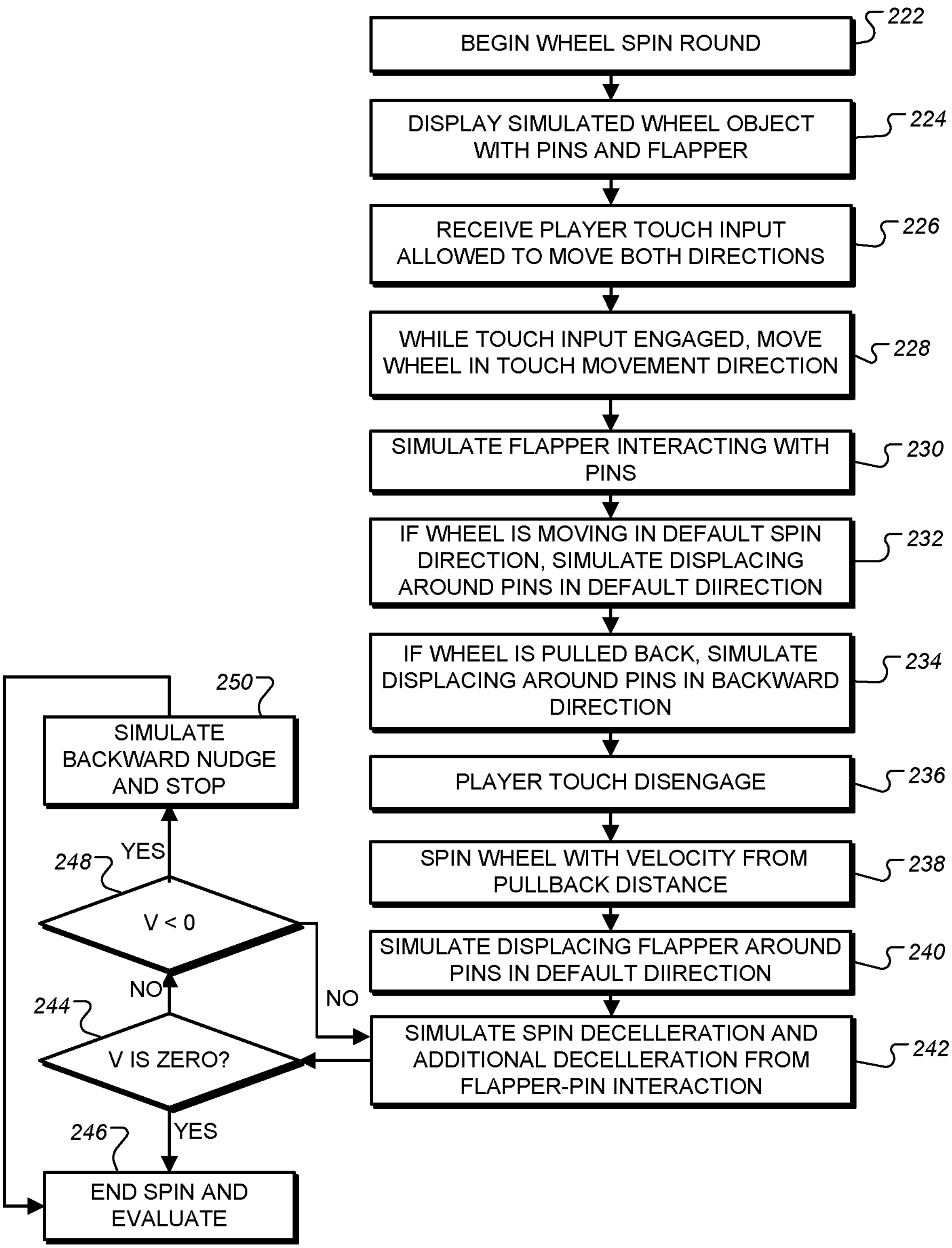
FIG. 2 is a flowchart of a process conducted with the gaming machine according an example embodiment.
Figure 3:
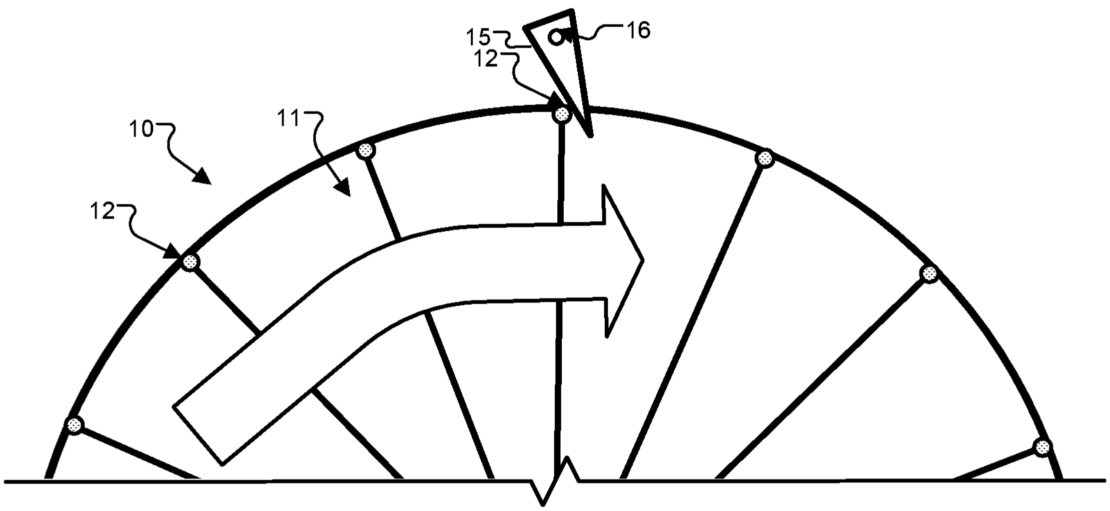
FIG. 3 is a graphics diagram showing direction of touch input movement and flapper simulation.
Figure 4:
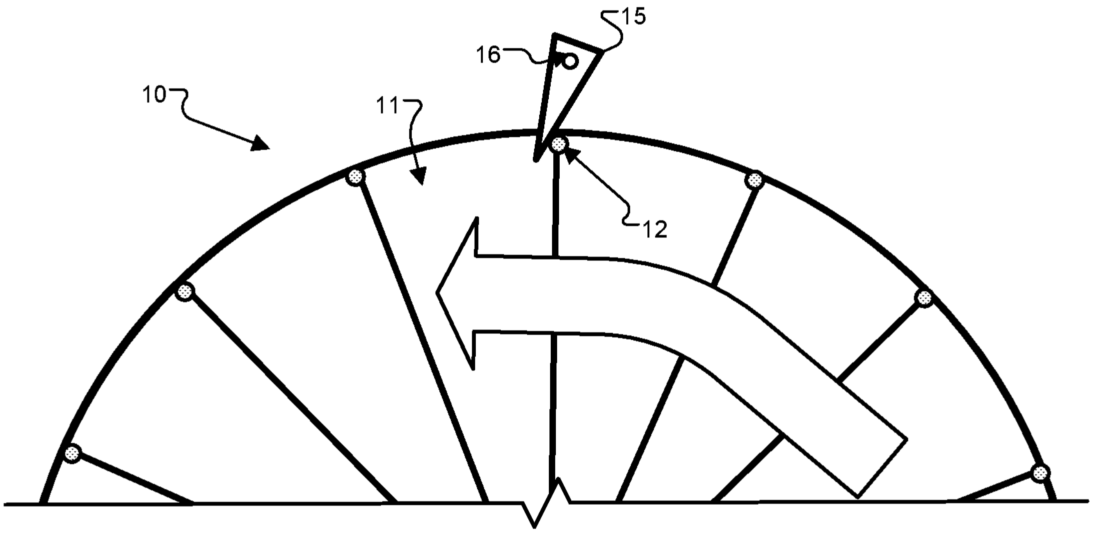
FIG. 4 is another graphics diagram showing direction of touch input movement and flapper simulation.

FIG. 2 shows a block diagram of a software process for operating the wheel 10 in a wheel spin game round according to an example embodiment. The process begins at block 222, which may be entered in a variety of ways such as, by triggering a bonus round of a base wagering game, by triggering a bonus feature in a bonus game of a wagering game, through a direct wager on a wheel spin, or other suitable triggering mechanisms known in the industry. At block 224, the process includes displaying the wheel 10 on one of the electronic displays, the wheel including multiple segments 11 separated radially, and simulated pin objects 12 separating the segments along the edge of the wheel and having a defined size. The process also includes displaying a simulated flapper object 15 along an edge of the wheel, the simulated flapper object having a first end outside of the wheel radius and a second extending, in a rest position, radially inside the wheel radius at least to the radial location of the simulated pin objects, and an axis of rotation 16 disposed toward the first end. Next, at block 226, the process includes receiving a player touch input through the touchscreen interface to move the wheel and activate a wheel spin. While the touch input is still engaged at block 228, the process includes allowing the player touch input to move the wheel in a default wheel spin direction or to pull back the wheel opposite to the default wheel spinning direction. This allows a more realistic interaction with the simulated wheel object 10 than games in which a button activates a wheel spin, or the wheel can only be moved forward in the default wheel spin direction, which is typically clockwise according to standard conventions. Next at block 230, the process includes simulating interaction of the simulated flapper object 15 and the simulated pin objects 12. As shown at block 232, the simulation includes, if the wheel is moving in the default wheel spin direction, rotationally displacing the simulated flapper object in the default wheel spin direction to allow the simulated pin object to pass. Such a simulated interaction is depicted in FIG. 3, in which the arrow depicts the direction of motion received from the player touch input. As depicted, a simulated pin object 12 is interacting with the simulated flapper object 15 to rotationally displace the flapper object 15 in the default spin direction, the direction of motion of the simulated pin object 12. During the player touch interaction, if the wheel is moving opposite to the default wheel spin direction, or is pulled back in the counterclockwise direction as indicated at block 234, the process includes rotationally displacing the simulated flapper object opposite to the default wheel spin direction to allow the pin to pass as shown at block 234. This interaction is depicted in FIG. 4, in which the arrow shows a counterclockwise motion input being received through the player touchscreen interface. As can be seen, a simulated pin object 12 is shown interacting with the simulated flapper object 15 to displace it rotationally around its axis of rotation 16 to simulate the physical interaction of the pin object 12 pushing past the flapper object 15 as the wheel turns.

Next, at block 236, the process includes detecting the player touch disengagement indicating the player is done with their desired spinning motion to spin the wheel 10. Such disengagement may occur if the player touch input moves too far away from the simulated wheel object 10 on the touchscreen display, if the player rotates the wheel counterclockwise and then lifts their touch input, or if the player moves their touch input in a forward spin motion and releases it to indicate a forward spin. In response to the player pulling back the wheel before the touch disengagement, the process at block 238 determines an initial velocity of the wheel spin based on a rotational distance that the wheel is pulled back. For forward spin motions included in the player touch input, which are allowed in some versions, the velocity may be taken directly from the player's touch input motion velocity, or a scaled version of the same to ensure a certain minimum wheel spin velocity is achieved. In such case, the initial spin velocity of the wheel is determined by the process at block 238.

Figure 5A:
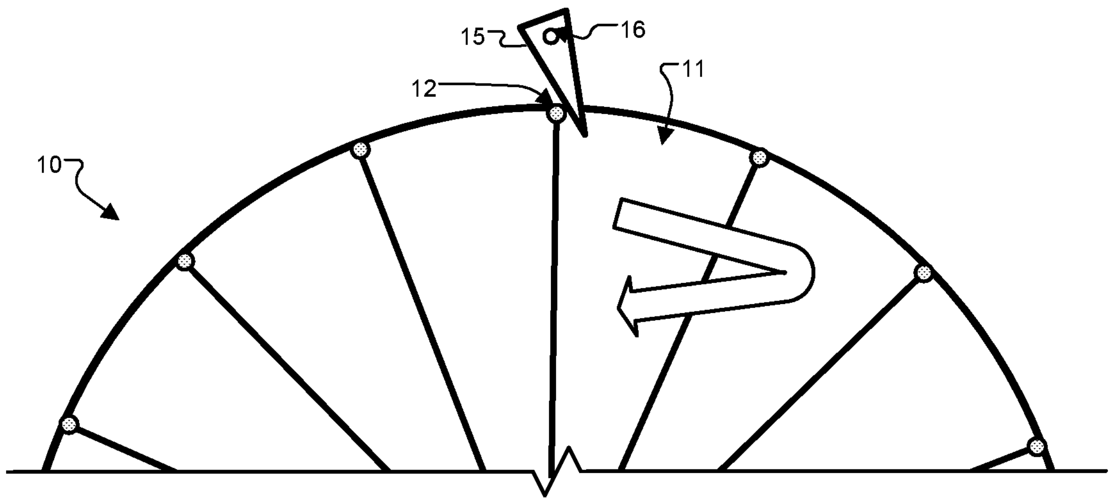
FIGS. 5A and 5B are a sequence of graphics diagrams showing direction and position of simulated objects during a simulated nudge of a pin and flapper.
Figure 5B:
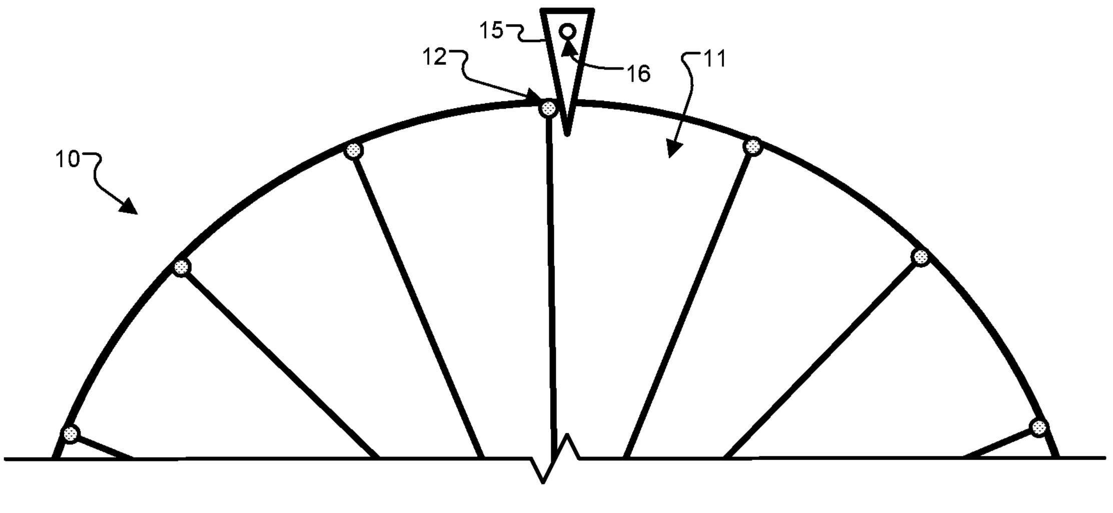

Next, at block 240, the process continues to simulate the wheel spin by displacing the simulated flapper object in the default spin direction around the simulated pin objects as they spin past on the wheel 10. Such displacement is shown in a process block in order, yet in reality it occurs as a constant process while the wheel is spinning. At block 240, the process may simulate a wheel spin at the initial velocity for a certain time before beginning deceleration of the wheel spin, or may immediately begin deceleration after the spin achieves the initial velocity. It should be noted that at block 238 a spin up time period may be simulated in which the wheel accelerates to reach the initial spin velocity. At block 242, the process begins to simulate the spin deceleration. Preferably this includes a constant deceleration, which may simulate frictional forces that would slow the wheel spin at a constant rate, and an additional deceleration caused by the simulated interaction of the simulated flapper object 15 as it is displaced by the simulated pin objects 12. As the process continues simulating the wheel spin deceleration, it continues until the wheel spin velocity goes to zero, as shown at decision block 244, or is determined to be less than zero at decision block 248, which may result when a simulated interaction with the simulated flapper object 15 is able to stop the wheel and impart a backward nudge motion. If the velocity in the simulation is determined to go under zero, the process goes to process block 250 where it simulates a slight backward knowledge of the wheel 10 and then a stop of the wheel 10. This process preferably uses a small fixed amount of deceleration associated with the displacement of simulated flapper object 15 by a simulated pin object 12. The depicted blocks 244, 248, and 250 provide two different ways to end the simulated wheel spin in a realistic manner. The first with the velocity of the wheel slowing 20 while the simulated flapper object 15 is within a segment 11 of the wheel 10, and the second allowing the wheel to stop with the simulated flapper object 15 touching a simulated pin object 12, which interaction may nudge the wheel 10. The nudge process is depicted in the sequence of FIG. 5A and FIG. 5B. As shown in FIG. 5, the arrow depicts the motion of the wheel 10 as the wheel 10 velocity falls 20 and past zero, thereby imparting a nudge motion to the wheel in which a slight backward movement is simulated as the simulated flapper object 15 is displaced by the simulated pin object 12 with a simulated resistance force which nudges the wheel 10 to a stop and slightly backwards. The wheel 10 then comes to rest with the wheel in flapper object in a position similar to that shown in FIG. 6, with the simulated flapper object 15 resting against a simulated pin object 12. In these conditions, depending on the exact velocity of the wheel 10 as the final interaction of the spin is simulated, the simulated flapper object 15 may come to rest pointing straight down or at a slightly displaced angle. As is typical with wheel spin games, the simulated flapper object 15 points to a segment 11 when the wheel 10 stops to indicate that segment 11 is selected by the wheel spin in the evaluation at block 246 of FIG. 2.

Figure 6:
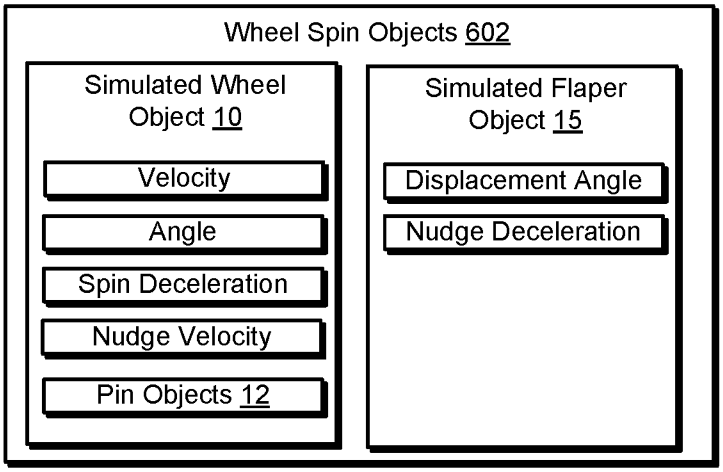
FIG. 6 is a software object block diagram for those objects involved in the wheel spin according to an example embodiment.

Simulating the nudge of wheel 10 may includes calculating a wheel movement based on a flapper rotation variable, a nudge velocity variable, and a nudge deceleration variable under control of the simulated wheel program code. Such variables are shown in FIG. 6, which is a software object block diagram for those objects involved in the wheel spin. The nudge deceleration variable is shown associated with the simulated flapper object 15, simulating its mechanical stiffness and resistance to displacement while simulated pin object 12 moves past the simulated flapper object 15 during the spin. The process may also track states of the wheel including a pulling back state in which the player is pulling back the wheel, a spinning up state in which the wheel is accelerating to begin a wheel spin, a spinning state, and a stopping state in which the nudge may be applied. Further, the process may include activating the wheel spin upon disengagement of the player touch input by removing the touch input or moving the touch input out of a designated area, and in response to the player pulling back wheel 10 before the touch disengagement to determine an initial velocity of the wheel spin based on a rotational distance that the wheel is pulled back. All these process steps are typically performed by executing program code in game program code 204 (FIG. 8) on the gaming machine. However, this is not limiting and any particular process steps may be performed by executing program code on another machine in the gaming network (for example, the network of FIG. 9 or FIG. 10), such as a game server interacting with a thin client version of the gaming machine, or a dedicated wheel spin gaming server.

Further, while the game wheel executable program code instructions and related methods described herein are preferably executed by a Class III gaming machine, it should be understood that this is only one example embodiment, and other versions may divide the processing tasks of the game method in a different manner. For example, some systems may employ a thin client architecture in which practically all of the processing tasks are performed at the game server, and only display information for the player interface transmitted to the electronic gaming machine. In such an embodiment, only the steps involving player input or display are performed by the electronic gaming machine, with the remaining steps performed by one of the game servers in the system. In such a case, though, the software architecture is preferably designed as a thin client in which a dedicated virtual machine running on the game server (or a virtual machine server connected in the gaming network) performs the tasks designated in the present drawing as occurring "at the gaming machine." In the depicted method, the method is performed by the respective computer hardware operating under control of computer program code. While central processor arrangements may vary (for example award controllers may be integrated on the same machine with a gaming server, or may be a separate server connected on a secure network), the particular central determinant architecture is not limiting and will be referred to generally in this drawing as the game server. The division of game logic steps between gaming machines and servers is known in the art and may be accomplished according to suitable methods allowed for the relevant gaming jurisdictions.

Figure 7:
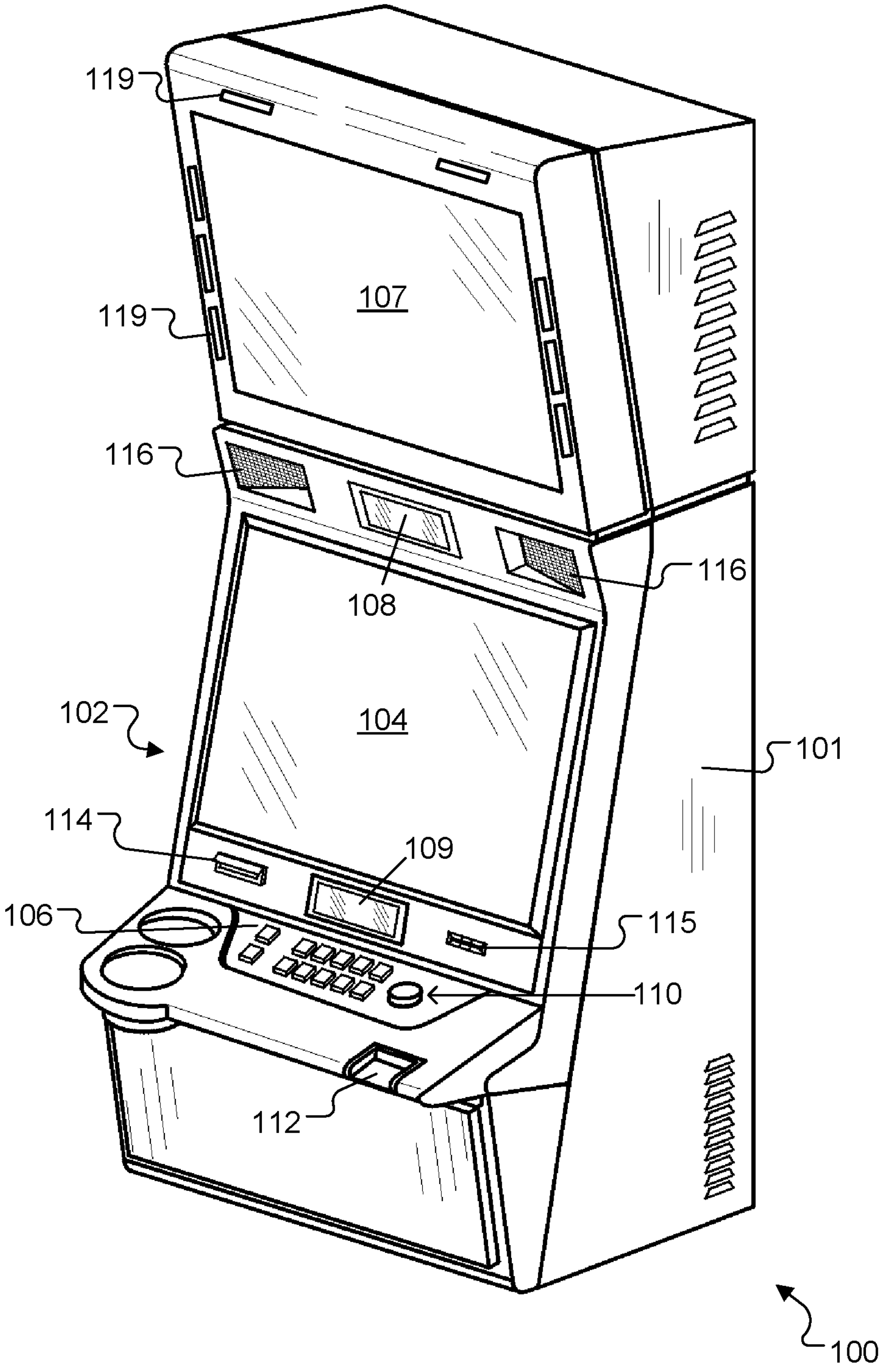
FIG. 7 is a front perspective view of a gaming machine which may be used in a gaming system embodying the principles of the present invention.
Figure 8:
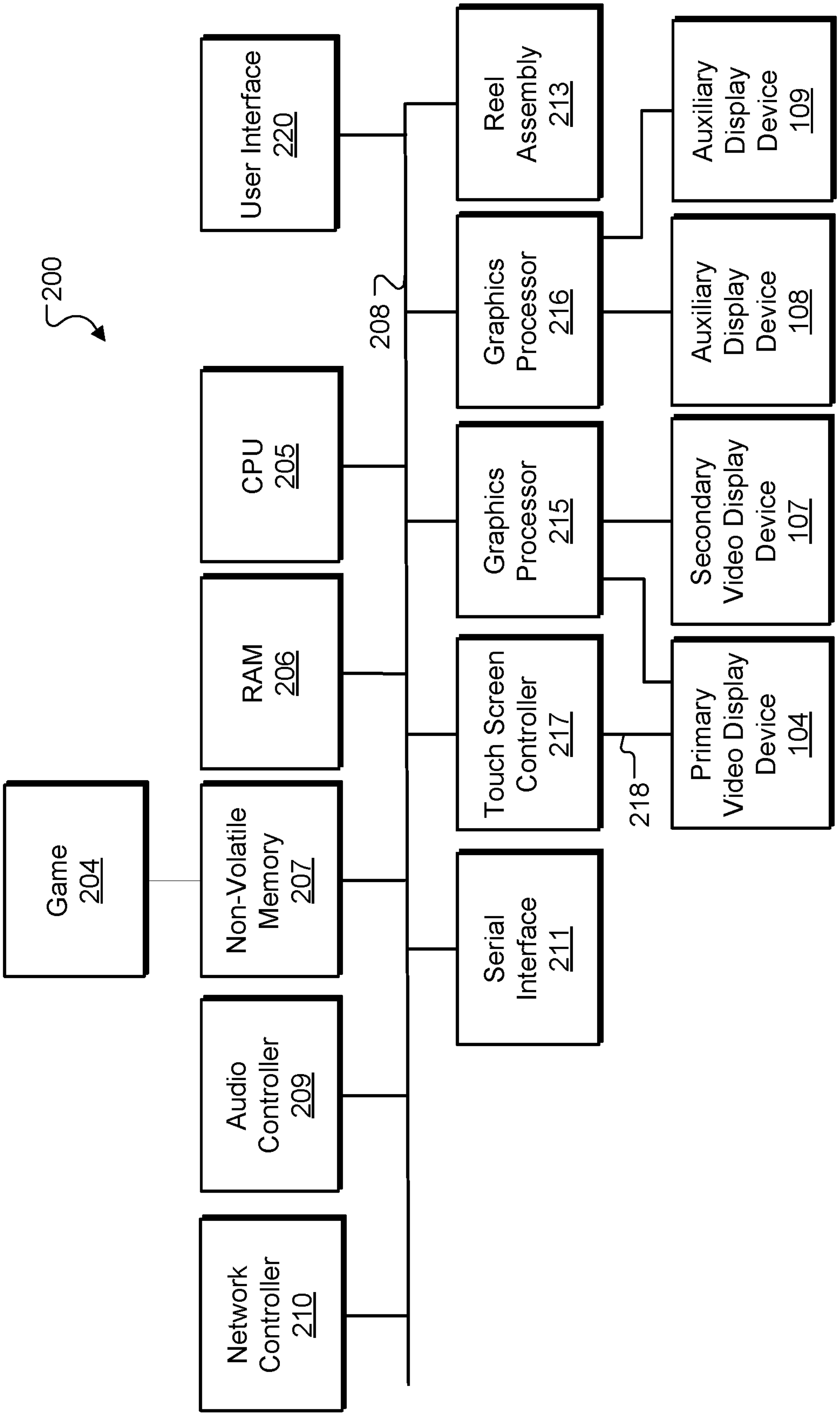
FIG. 8 is a block diagram showing various electronic components of the gaming machine shown in FIG. 7 together with additional gaming system components.

FIG. 7 shows a gaming machine 100 that may be used to implement an automated multimedia gaming presentation according to the present invention. The block diagram of FIG. 8 shows further details of gaming machine 100. Referring to FIG. 7, gaming machine 100 includes a cabinet 101 having a front side generally shown at reference numeral 102. A primary video display device 104 is mounted in a central portion of the front surface 102, with a ledge 106 positioned below the primary video display device and projecting forwardly from the plane of the primary video display device. In addition to primary video display device 104, the illustrated gaming machine 100 includes a secondary video display device 107 positioned above the primary video display device. Gaming machine 100 also includes two additional smaller auxiliary display devices, an upper auxiliary display device 108 and a lower auxiliary display device 109. Either of displays 104 or 107 may include a touchscreen interface, and be employed to provide the wheel spin interface described herein. Or, an associated group display such as that of FIG. 9 may provide the wheel spin interface. It should also be noted that each display device referenced herein may include any suitable display device including a cathode ray tube, liquid crystal display, plasma display, LED display, or any other type of display device currently known or that may be developed in the future.

In preferred versions, the gaming machine 100 illustrated in FIG. 7 also includes a number of mechanical control buttons 110 mounted on ledge 106. These control buttons 110 may allow a player to select a bet level, select pay lines, select a type of game or game feature, and actually start a play in a primary game. Other forms of gaming machines according to the invention may include switches, joysticks, or other mechanical input devices, and/or virtual buttons and other controls implemented on a suitable touch screen video display. For example, primary video display device 104 in gaming machine 100 provides a convenient display device for implementing touch screen controls.

It will be appreciated that gaming machines may also include a number of other player interface devices in addition to devices that are considered player controls for use in playing a particular game. Gaming machine 100 also includes a currency/voucher acceptor having an input ramp 112, a player card reader having a player card input 114, and a voucher/receipt printer having a voucher/receipt output 115. Audio speakers 116 generate an audio output to enhance the player's playing experience. Decorative lights 119 are placed, in this version, along the top of the machine and beside secondary display 107, but may also be in other suitable locations such a topper light on the top surface, along the machine's belly (the front panel under the ledge 106) or behind translucent portions of the machine belly glass, around primary display 104, or on the cabinet sides as well. These lights may be controlled to dim, flash, change colors, or otherwise alter along with the musical beats as described herein. Numerous other types of devices may be included in gaming machines that may be used according to the present invention.

FIG. 8 shows a logical and hardware block diagram 200 of gaming machine 100 which includes a central processing unit (CPU) 205 along with random access memory 206 and nonvolatile memory or storage device 207. All of these devices are connected on a system bus 208 with an audio controller 209, a network controller 210, and a serial interface 211. A graphics processor 215 is also connected on bus 208 and is connected to drive primary video display device 104 and secondary video display device 107 (both mounted on cabinet 101 as shown in FIG. 7). A second graphics processor 216 is also connected on bus 208 in this example to drive the auxiliary display devices 108 and 109 also shown in FIG. 7. As shown in FIG. 8, gaming machine 100 also includes a touch screen controller 217 connected to system bus 208. Touch screen controller 217 is also connected via signal path 218 to receive signals from a touch screen element associated with primary video display device 104. It will be appreciated that the touch screen element itself typically comprises a thin film that is secured over the display surface of primary video display device 104. The touch screen element itself is not illustrated or referenced separately in the figures.

Those familiar with data processing devices and systems will appreciate that other basic electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 8 are elements commonly associated with a personal computer. These elements are preferably mounted on a standard personal computer chassis and housed in a standard personal computer housing which is itself mounted in cabinet 101 shown in FIG. 7. Alternatively, the various electronic components may be mounted on one or more circuit boards housed within cabinet 101 without a separate enclosure such as those found in personal computers. Those familiar with data processing systems and the various data processing elements shown in FIG. 8 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 8 as being connected directly on system bus 208 may in fact communicate with the other system components through a suitable expansion bus. Audio controller 209, for example, may be connected to the system via a PCI bus. System bus 208 is shown in FIG. 8 merely to indicate that the various components are connected in some fashion for communication with CPU 205 and is not intended to limit the invention to any particular bus architecture. Numerous other variations in the gaming machine internal structure and system may be used without departing from the principles of the present invention.

It will also be appreciated that graphics processors are also commonly a part of modern computer systems. Although separate graphics processor 215 is shown for controlling primary video display device 104, secondary video display device 107, and graphics processor 216 is shown for controlling both auxiliary display devices 108 and 109, it will be appreciated that CPU 205 may control all of the display devices directly without any intermediate graphics processor. The invention is not limited to any particular arrangement of processing devices for controlling the video display devices included with gaming machine 100. Also, a gaming machine implementing the present invention is not limited to any particular number of video display device or other types of display devices.

In the illustrated gaming machine 100, CPU 205 executes software which ultimately controls the entire gaming machine including the receipt of player inputs and the presentation of the graphic symbols displayed according to the invention through the display devices 104, 107, 108, and 109 associated with the gaming machine. As will be discussed further below, CPU 205 either alone or in combination with graphics processor 215 may implement a presentation controller for performing functions associated with a primary game that may be available through the gaming machine and may also implement a game client for directing one or more display devices at the gaming machine to display and perform the multimedia presentation techniques of the present invention. CPU 205 also executes software related to communications handled through network controller 210, and software related to various peripheral devices such as those connected to the system through audio controller 209, serial interface 211, and touch screen controller 217. CPU 205 may also execute software to perform accounting functions associated with game play. Random access memory 206 provides memory for use by CPU 205 in executing its various software programs while the nonvolatile memory or storage device 207 may comprise a hard drive or other mass storage device providing storage for programs not in use or for other data generated or used in the course of gaming machine operation. Network controller 210 provides an interface to other components of a gaming system in which gaming machine 100 is included. In particular, network controller 210 provides an interface to a game controller which controls certain aspects of the wheel spin simulation round as described with respect to FIG. 2.

It should be noted that the invention is not limited to gaming machines employing the personal computer-type arrangement of processing devices and interfaces shown in example gaming machine 100. Other gaming machines through which the automated multimedia presentation techniques herein are implemented may include one or more special purpose processing devices to perform the various processing steps for implementing the present invention. Unlike general purpose processing devices such as CPU 205, these special purpose processing devices may not employ operational program code to direct the various processing steps.

It should also be noted that the invention is not limited to gaming machines including only video display devices for conveying results. It is possible to implement the base game within the scope of the present invention using an electro mechanical arrangement or even a purely mechanical arrangement for displaying the symbols needed to complete the game as described herein. However, the most preferred forms of the invention utilize one or more video display devices for displaying the spinning reels, the animated symbols, and the other synchronized multimedia animations.

Still referring to the hardware and logical block diagram 200 showing an example design for a gaming machine 100, the depicted machine in operation is controlled generally by CPU 205 which stores operating programs and data in memory 207 with wagering game program code 204, user interface 220, network controller 210, audio/visual controllers, and reel assembly 213 (if a mechanical reel configuration). CPU or game processor 205 may comprise a conventional microprocessor, such as an Intel® Pentium® microprocessor, mounted on a printed circuit board with supporting ports, drivers, memory, software, and firmware to communicate with and control gaming machine operations, such as through the execution of coding stored in memory 207 including one or more wagering games 204. Game processor 205 connects to user interface 220 such that a player may enter input information and game processor 205 may respond according to its programming, such as to apply a wager and initiate execution of a game.

Figure 10:
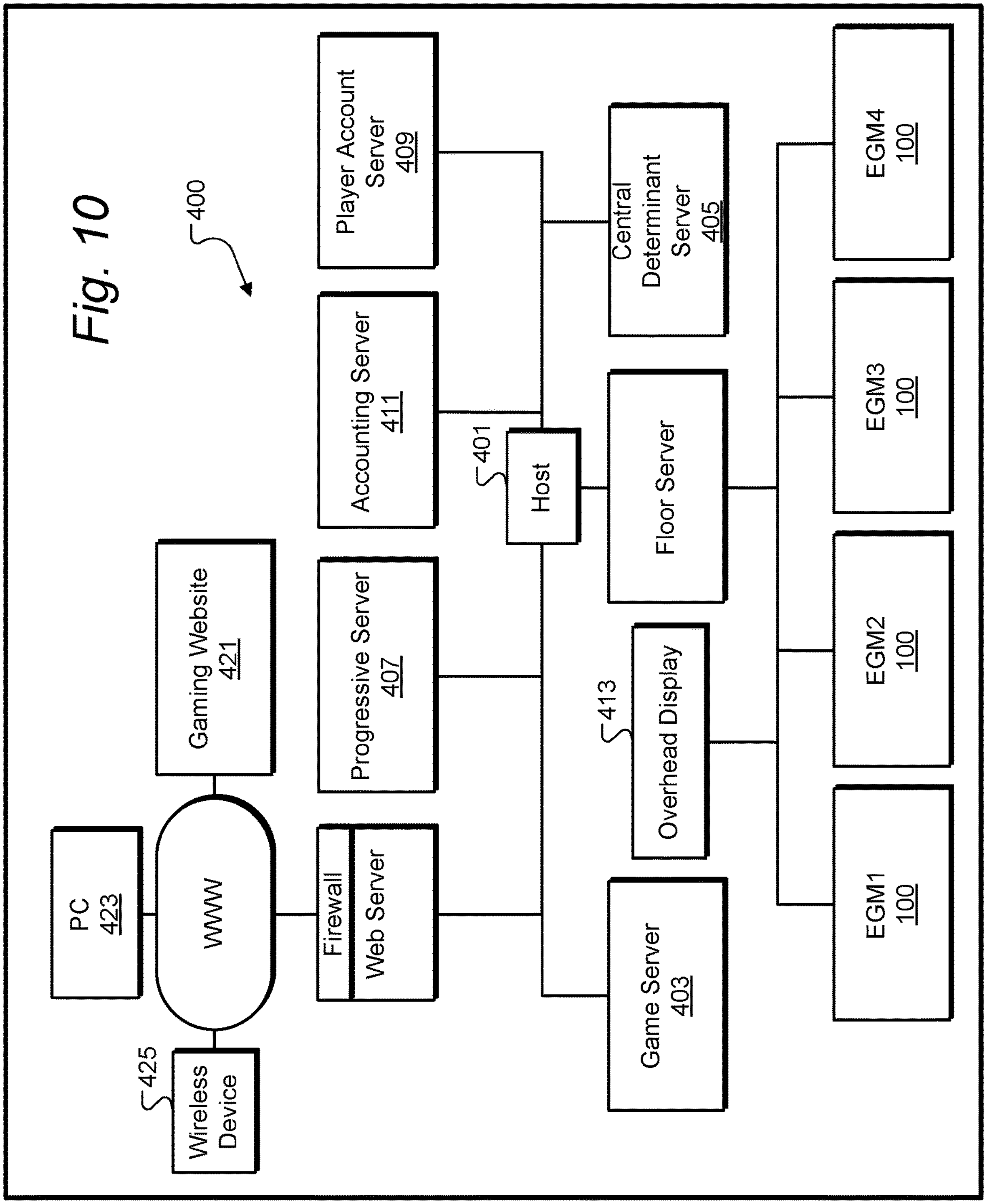
FIG. 10 is a system block diagram of a gaming system according to another embodiment.

Game processor 205 also may connect through network controller 210 to a gaming network, such as example casino server network system 400 shown in FIG. 10. Referring now to FIG. 10, the casino server system 400 may be implemented over one or more site locations and include host server 401, remote game play server 403 (which may be configured to provide game processor functionality including determining game outcomes and providing audio/visual instructions to a remote gaming device), central determinant server 405 (which may be configured to determine lottery, bingo, or other centrally determined game outcomes and provide the information to networked gaming machines 100 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 100), player account server 409 (which may be configured to collect and store player information and/or awards and to provide player information to gaming machines 100 after receiving player identification information such as from a player card), and accounting server 411 (which may be configured to receive and store data from networked gaming machines 100 and to use the data to provide reports and analyses to an operator). Through its network connection, gaming machine 100 may be monitored by an operator through one or more servers such as to assure proper operation, and, data and information may be shared between gaming machine 100 and respective of the servers in the network such as to accumulate or provide player promotional value, to provide server-based games, or to pay server-based awards.

Figure 9:
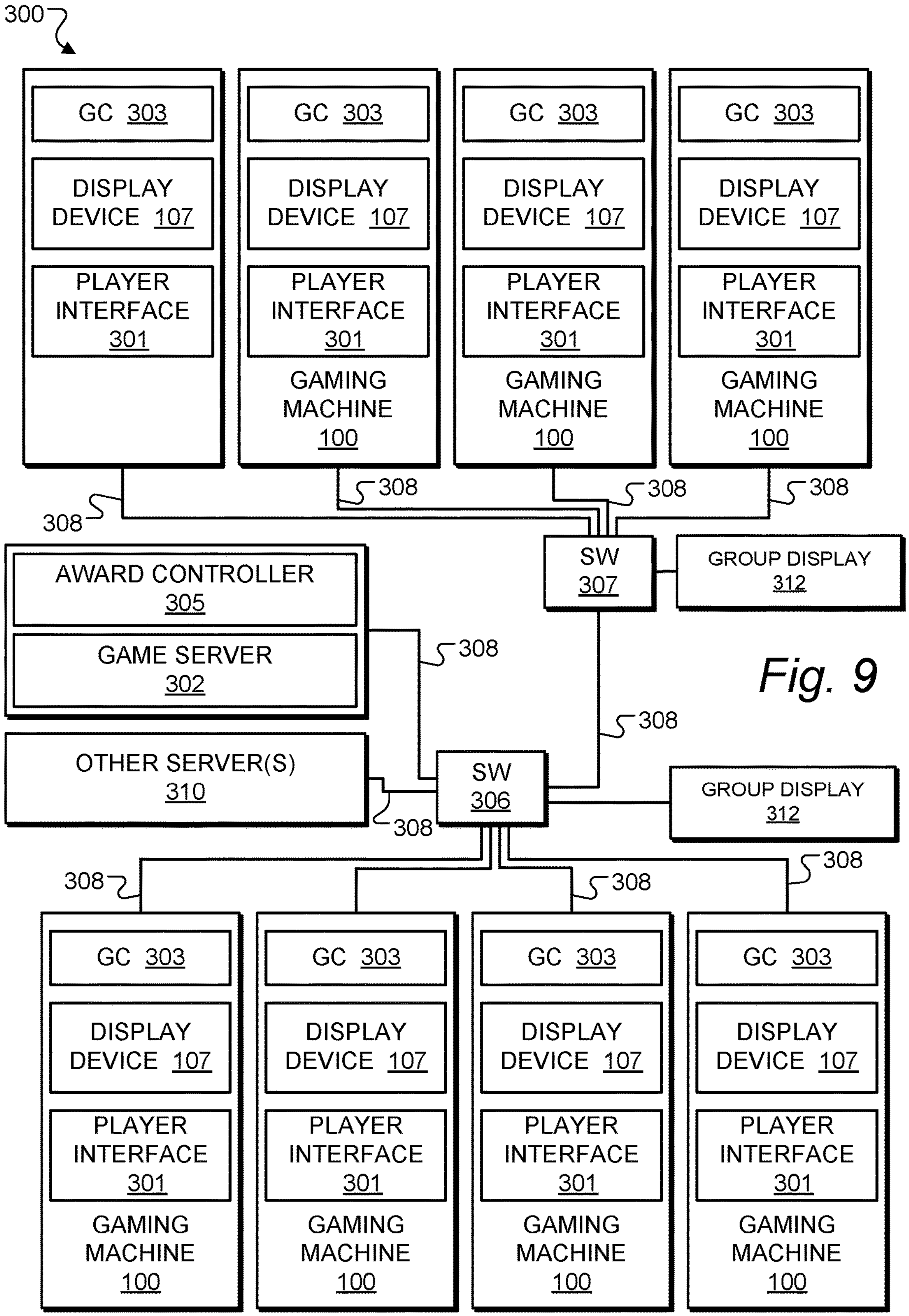
FIG. 9 is a system block diagram of a gaming system according to one embodiment of the present invention.

Referring now to FIG. 9, a gaming system 300 according to another embodiment of the present invention is shown again in a network and system diagram format. System 300 includes a number of gaming machines, each comprising a gaming machine 100 in this example implementation. For purposes of describing system 300, each gaming machine 100 in FIG. 9 is shown as including a video display device 107 and a player interface that may include buttons, switches, or other physical controls and/or touch screen controls as discussed above in connection with FIG. 9. This player interface is labeled 301 in FIG. 9. System 300 further includes a game server 302 and a respective game client 303 (abbreviated "GC" in FIG. 9) included with each respective gaming machine 100. In the form of the invention shown in FIG. 9 these two components, game server 302 and the game client components 303 combine to implement a game control arrangement which will be described in detail below. As depicted, groups of gaming clients 303 may have an associated group display 312, which is preferably connected over the network. Group display 312 may include a touch screen interface allowing the wheel spin game with player interaction as described herein to be provided through group display 312. System 300 also includes an award controller 305, which is shown in FIG. 9 as being associated with game server 302 to indicate that the two components may be implemented through a common data processing device/computer system. Gaming machines 100, game server 302, and award controller 305 are connected in a network communication arrangement including first and second network switches 306 and 307, connected together through various wired or wireless signal paths, all shown as communications links 308 in FIG. 9.

Each gaming machine 100, and particularly player interface 301 associated with each gaming machine, allows a player to make any inputs that may be required to make the respective gaming machine eligible for the game, and make player touch inputs at the respective gaming machine in the course of the wheel spin game round. Player interface 301 also allows a player at the gaming machine to initiate plays in a primary game available through the gaming machine in some implementations. The respective video display device 107 associated with each respective gaming machine 100 is used according to the invention to generate the graphic displays to show the various elements of a wheel spin game round at the respective gaming machine.

The game control arrangement made up of game server 302 and the respective game client 303 at a given gaming machine functions to control the respective video display device 107 for that gaming machine to display the selectable objects. Award controller 305 is responsible for awarding prizes for a player's participation, and maintaining progressive prize information where the game offers one or more progressive prizes. The network arrangement made up of network switches 306 and 307, and the various communication links 308 shown in FIG. 9 is illustrated merely as an example of a suitable communications arrangement. It should be noted that the game control arrangement, or as it is referred to generally the "game controller," may be implemented in some embodiments entirely on the gaming machine. This is especially true in jurisdictions that allow Class III gaming conducted with random number generators at each gaming machine. The present invention is not limited to any particular communications arrangement for facilitating communications between game server 302 and various gaming machines 100. Any wired or wireless communication arrangement employing any suitable communications protocols (such as TCP/IP for example) may be used in an apparatus according to the invention.

FIG. 9 shows other server(s) 310 included in the network. This illustrated "other server(s)" element 310 may include one or more data processing devices for performing various functions related to games conducted through system 300 and any other games that may be available to players through gaming machines 100. For example, apparatus 300 may be accounting servers providing support for cashless gaming or various forms of mixed cash/cashless gaming through the various gaming machines 100. In this example, an additional one of the other servers 310 will be included in apparatus 300 for supporting these types of wagering and payout systems. As another example, the various gaming machines 100 included in system 300 may allow players to participate in a game (primary game) other than the game described herein, and this other game may rely on a result identified at or in cooperation with a device that is remote from the gaming machines. In this example, another server 310 may be included in the system for identifying results for the primary game and communicating those results to the various gaming machines 100 as necessary. Generally, the other server(s) 310 shown in FIG. 9 are shown only to indicate that numerous other components may be included along with the elements that participate in providing persistent indicia features according to the present invention. Other server(s) 310 may provide record keeping, player tracking, accounting, result identifying services, or any other services that may be useful or necessary in a gaming system.

Referring to FIG. 10, a block diagram of another example networked gaming system 400 associated with one or more gaming facilities is shown, including one or more networked gaming machines 100 in accordance with one or more embodiments. While a few servers have been shown separately, they may be combined or split into additional servers having additional capabilities.

As shown, networked gaming machines 100 (EGM1-EGM4) and one or more overhead displays 413 may be network connected and enable the content of one or more displays of gaming machines 100 to be mirrored or replayed on an overhead display. For example, the primary display content may be stored by the display controller or game processor 205 and transmitted through network controller 210 to the overhead display controller either substantially simultaneously or at a subsequent time according to either periodic programming executed by game processor 205 or a triggering event, such as a jackpot or large win, at a respective gaming machine 100. In the event that gaming machines 100 have cameras installed, the respective players' video images may be displayed on overhead display 413 along with the content of the player's display 100 and any associated audio feed.

In one or more embodiments, game server 403 may provide server-based games and/or game services to network connected gaming devices, such as gaming machines 100 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e.g. game personalizing selections or options). For example, the player tracking display may be programmed to display a player menu that may include a choice of personalized gaming selections that may be applied to a gaming machine 100 being played by the player.

In one or more embodiments, the player menu may be programmed to display after a player inserts a player card into the card reader. When the card reader is inserted, an identification may be read from the card and transmitted to player account server 409. Player account server 409 transmits player information through network controller 210 to user interface 220 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor 205 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Blackberry® cell phone, Apple® iPhone®, personal data assistant (PDA), iPad®, etc.). To enter the website, a player may log in with a username (that may be associated with the player's account information stored on player account server 409 or be accessible by a casino operator to obtain player data and provide promotional offers), play various games on the website, make various personalizing selections, and save the information, so that during a next gaming session at a casino establishment, the player's playing data and personalized information may be associated with the player's account and accessible at the player's selected gaming machine 100.

Any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

Further, as described herein, the various features have been provided in the context of various described embodiments, but may be used in other embodiments. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A gaming machine for providing a wagering game, the gaming machine comprising:
- a gaming cabinet,
- one or more electronic displays associated with the gaming cabinet, at least one of the electronic displays having a touchscreen interface;
- at least one electronic controller installed in the gaming cabinet and operable to control the electronic displays;
- a wager input device mounted in the cabinet and operable to receive and scan currency, vouchers, or a player cards to establish a credit balance;
- tangible, non-transitory electronically accessible memory coupled to the at least one electronic controller and containing program code executable by the at least one electronic controller for:
  - displaying a simulated wheel object (wheel) on one of the electronic displays, the wheel including multiple segments separated radially, and simulated pin objects separating the segments along the edge of the wheel and having a defined size;
  - displaying a simulated flapper object along an edge of the wheel, the simulated flapper object having a first end outside of the wheel radius and a second end extending, in a rest position, radially inside the wheel radius at least to the radial location of the simulated pin objects, and an axis of rotation disposed toward the first end;
  - receiving a player touch input through the touchscreen interface to move the wheel and activate a wheel spin;
  - allowing the player touch input, while engaged, to move the wheel in a default wheel spin direction or to pull back the wheel opposite to the default wheel spin direction; and
  - simulating physical interaction of the simulated flapper object and the simulated pin objects by, (a) if the wheel is moving in the default wheel spin direction, rotationally displacing the simulated flapper object in the default wheel spin direction to allow a selected simulated pin object to pass and (b) if the wheel is moving opposite to the default wheel spin direction, rotationally displacing the simulated flapper object opposite to the default wheel spin direction to allow the selected simulated pin object to pass.

2. The gaming machine of claim 1, in which the program code is further executable for:
- when the wheel spin is activated, simulating a wheel spin in the default wheel spin direction and then simulating a spin deceleration and a wheel stop;
- while simulating the wheel spin, further simulating physical interaction of the simulated flapper object and the simulated pin objects including an additional wheel deceleration when the simulated flapper object is displaced by a passing simulated pin object; and
- if a simulated velocity of the wheel when beginning the simulated physical interaction is less than the additional wheel deceleration, simulating a nudge of the wheel opposite the default wheel spin direction.

3. The gaming machine of claim 2, in which simulating the nudge of the wheel includes calculating a wheel movement based on a flapper rotation variable, a nudge velocity variable, and a nudge deceleration variable.

4. The gaming machine of claim 2, further comprising program code operable to track states of the wheel including a pulling back state in which the player is pulling back the wheel, a spinning-up state in which the wheel is accelerating to begin the wheel spin, a spinning state, and a stopping state in which the nudge may be applied.

5. The gaming machine of claim 1, in which the program code is further executable for activating the wheel spin upon disengagement of the player touch input by removing the player touch input or moving the touch input out of a designated area, and in response to the player pulling back the wheel before a touch disengagement, to determine an initial velocity of the wheel spin based on a rotational distance that the wheel is pulled back.

6. The gaming machine of claim 1, in which one of the electronic displays is a group display associated with the gaming machine and one or more additional gaming machines in a group, and the gaming machine is operable to conduct the wheel spin and player touch interaction.

7. A method for providing player interaction on a gaming machine, the method comprising:

under control of an electronic processor in a gaming machine, displaying a simulated wheel object (wheel) on an electronic display, the wheel including multiple segments separated radially, and simulated pin objects separating the segments along the edge of the wheel and having a defined size;

displaying a simulated flapper object along an edge of the wheel, the simulated flapper object having a first end outside of the wheel radius and a second end extending, in a rest position, radially inside the wheel radius at least to the radial location of the simulated pin objects, and an axis of rotation disposed toward the first end;

receiving a player touch input through a touchscreen interface of the electronic display to move the wheel and activate a wheel spin;

allowing the player touch input, while engaged, to move the wheel in a default wheel spin direction or to pull back the wheel opposite to the default wheel spin direction; and simulating physical interaction of the simulated flapper object and the simulated pin objects by, (a) if the wheel is moving in the default wheel spin direction, rotationally displacing the simulated flapper object in the default wheel spin direction to allow a selected simulated pin object to pass and (b) if the wheel is moving opposite to the default wheel spin direction, rotationally displacing the simulated flapper object opposite to the default wheel spin direction to allow the selected simulated pin object to pass.

8. The method of claim 7, further comprising:

when the wheel spin is activated, simulating a wheel spin in the default wheel spin direction and then simulating a spin deceleration and a wheel stop;

while simulating the wheel spin, further simulating physical interaction of the simulated flapper object and the simulated pin objects including an additional wheel deceleration when the simulated flapper object is displaced by a passing simulated pin object; and if a simulated velocity of the wheel when beginning the simulated physical interaction is less than the additional wheel deceleration, simulating a nudge of the wheel opposite the default wheel spin direction.

9. The method of claim 8, in which simulating the nudge of the wheel includes calculating a wheel movement based on a flapper rotation variable, a nudge velocity variable, and a nudge deceleration variable.

10. The method of claim 8, further comprising tracking states of the wheel including a pulling back state in which the player is pulling back the wheel, a spinning-up state in which the wheel is accelerating to begin the wheel spin, a spinning state, and a stopping state in which the nudge may be applied.

11. The method of claim 7, further comprising activating the wheel spin upon disengagement of the player touch input by removing the player touch input or moving the player touch input out of a designated area, and in response to the player pulling back the wheel before a touch disengagement, to determine an initial velocity of the wheel spin based on a rotational distance that the wheel is pulled back.

12. The method of claim 7, in which the electronic display is a group display associated with the gaming machine and one or more additional gaming machines in a group, and the gaming machine is operable to conduct the wheel spin and player touch interaction.

13. The method of claim 7, in which rotationally displacing the simulated flapper object opposite to the default wheel spin direction to allow a selected simulated pin object to pass further comprises tracking a rotational angle of the simulated flapper object, tracking a moving position of the simulated pin object, and calculating a rotational displacement based on a thickness of the simulated pin object.

14. The method of claim 7, in which rotationally displacing the simulated flapper object opposite to the default wheel spin direction to allow the simulated pin object to pass further comprises producing a simulated return to a stationary position of the simulated flapper object following the displacement.

15. A tangible, non-transitory electronically accessible memory containing program code executable by at least one electronic controller for:

displaying a simulated wheel object (wheel) on an electronic display, the wheel including multiple segments separated radially, and simulated pin objects separating the segments along the edge of the wheel and having a defined size;

displaying a simulated flapper object along an edge of the wheel, the simulated flapper object having a first end outside of the wheel radius and a second end extending, in a rest position, radially inside the wheel radius at least to the radial location of the simulated pin objects, and an axis of rotation disposed toward the first end;

receiving a player touch input through the touchscreen interface to move the wheel and activate a wheel spin;

allowing the player touch input, while engaged, to move the wheel in a default wheel spin direction or to pull back the wheel opposite to the wheel spinning direction; and simulating physical interaction of the simulated flapper object and the simulated pin objects by, (a) if the wheel is moving in the default wheel spin direction, rotationally displacing the simulated flapper object in the default wheel spin direction to allow a selected simulated pin object to pass and (b) if the wheel is moving opposite to the default wheel spin direction, rotationally displacing the simulated flapper object opposite to the default wheel spin direction to allow the pin to pass.

16. The tangible, non-transitory electronically accessible memory containing program code of claim 15, in which the program code is further executable for:

activating a wheel spin in response to disengagement of the player touch input;

when the wheel spin is activated, simulating a wheel spin in the default wheel spin direction and then simulating a spin deceleration and a wheel stop;

while simulating the wheel spin, further simulating physical interaction of the simulated flapper object and the simulated pin objects including an additional wheel deceleration when the simulated flapper object is displaced by a passing simulated pin object; and if a simulated velocity of the wheel when beginning the simulated physical interaction is less than the additional wheel deceleration, simulating a nudge of the wheel opposite the default wheel spin direction.

17. The tangible, non-transitory electronically accessible memory containing program code of claim 16, in which simulating the nudge of the wheel includes calculating a wheel movement based on a flapper rotation variable, a nudge velocity variable, and a nudge deceleration variable.

18. The tangible, non-transitory electronically accessible memory containing program code of claim 17, further comprising program code operable to track states of the wheel including a pulling back state in which the player is pulling back the wheel, a spinning up state in which the wheel is accelerating to begin the wheel spin, a spinning state, and a stopping state in which the nudge may be applied.

19. The tangible, non-transitory electronically accessible memory containing program code of claim 15, in which the program code is further executable for activating the wheel spin upon disengagement of the player touch input by removing the player touch input or moving the player touch input out of a designated area, and in response to the player pulling back the wheel before a touch disengagement, to determine an initial velocity of the wheel spin based on a rotational distance that the wheel is pulled back.

* * * * *